US010107449B2

(12) United States Patent
Hattabaugh (10) Patent No.: US 10,107,449 B2
(45) Date of Patent: Oct. 23, 2018

(54) FLIP-DOWN FRAME FOR A CEILING-MOUNTED TELEVISION

(71) Applicant: Daniel Hattabaugh, Page, AZ (US)

(72) Inventor: Daniel Hattabaugh, Page, AZ (US)

(*) Notice: Subject to any disclaimer, the term of this patent is extended or adjusted under 35 U.S.C. 154(b) by 0 days.

(21) Appl. No.: 15/483,938

(22) Filed: Apr. 10, 2017

(65) Prior Publication Data
US 2017/0292648 A1    Oct. 12, 2017

Related U.S. Application Data (60) Provisional application No. 62/321,023, filed on Apr. 11, 2016.

(51) Int. Cl.
| | | |
|---|---|---|
| *F16M 11/10* | (2006.01) | |
| *F16M 13/02* | (2006.01) | |
| *F16M 11/18* | (2006.01) | |
| *H04N 5/64* | (2006.01) | |

(52) U.S. Cl.
CPC .......... *F16M 13/027* (2013.01); *F16M 11/10* (2013.01); *F16M 11/18* (2013.01); *H04N 5/64* (2013.01)

(58) Field of Classification Search
USPC .......... 248/685, 276.1, 284.1, 291.1, 292.11, 248/286.1, 324, 325, 326
See application file for complete search history.

(56) References Cited

U.S. PATENT DOCUMENTS

| | | | | |
|---|---|---|---|---|
| 6,186,459 B1* | 2/2001 | Ma | ...................... | B60R 11/0235 224/311 |
| 6,340,146 B1* | 1/2002 | Tzeng | ................. | B60R 11/0223 16/270 |
| 6,416,027 B1* | 7/2002 | Hart | ...................... | A47B 81/065 248/317 |
| 6,419,196 B1* | 7/2002 | Sweere | .................. | A47B 21/00 248/276.1 |
| 6,446,925 B1* | 9/2002 | Wada | ................. | B64D 11/0015 248/286.1 |
| 7,055,790 B2* | 6/2006 | Schroeter | .................. | G09F 7/20 248/323 |
| 7,408,596 B2* | 8/2008 | Kunz | ................. | A47B 21/0073 248/286.1 |
| 7,866,619 B2* | 1/2011 | Yeo | ..................... | B60R 11/0235 248/274.1 |
| 8,944,395 B2* | 2/2015 | Bonito | ................ | B60R 11/0235 248/276.1 |
| 9,016,647 B2* | 4/2015 | Lu | .......................... | F16M 11/10 248/221.11 |
| 2002/0084395 A1* | 7/2002 | Johnson | ............... | A47B 46/005 248/276.1 |
| 2005/0051688 A1* | 3/2005 | Dittmer | .................. | F16M 11/10 248/276.1 |
| 2005/0236542 A1* | 10/2005 | O'Neill | .................. | F16M 11/10 248/286.1 |

(Continued)

*Primary Examiner* — Terrell L McKinnon
*Assistant Examiner* — Michael McDuffie
(74) *Attorney, Agent, or Firm* — Gurr Brande Spendlove, PLLC; Robert A. Gurr (57) ABSTRACT

A ceiling-mounted TV frame apparatus is disclosed having a fixed frame, a pivoting frame pivotally coupled to the fixed frame, and one or more linear actuators for actuating the pivoting frame. The pivoting frame nests within the fixed frame and is coupled thereto using a hinged or otherwise pivoting bracket.

8 Claims, 7 Drawing Sheets

(56) References Cited

U.S. PATENT DOCUMENTS

| | | | |
|---|---|---|---|
| 2008/0169402 A1* | 7/2008 | Sturt | B60R 11/0235 248/326 |
| 2009/0109352 A1* | 4/2009 | Lewis | B60R 11/0235 348/837 |
| 2009/0127422 A1* | 5/2009 | Kitazawa | B60R 11/0235 248/324 |
| 2012/0175478 A1* | 7/2012 | Chen | G06F 1/1624 248/286.1 |
| 2013/0075561 A1* | 3/2013 | Galletti | F16M 13/02 248/276.1 |

* cited by examiner

FLIP-DOWN FRAME FOR A CEILING-MOUNTED TELEVISION

CROSS-REFERENCE TO RELATED APPLICATIONS

This application claims the benefit of U.S. Provisional Application Ser. No. 62/321,023, filed on Apr. 11, 2016, which is incorporated herein by reference.

TECHNICAL FIELD

The present disclosure relates to TV mounting systems. More particularly, the present disclosure is directed to a ceiling-mounted TV frame apparatus.

BACKGROUND

Flat-panel televisions have increased in popularity in recent years and have become the new standard for television viewing. Due to their thin design, various brackets and frames have been created that allow a TV to be mounted to walls or other surfaces. This can be beneficial, as it doesn't require a TV stand or other cumbersome piece of furniture to be used in conjunction with the TV. This can be especially useful when a room has limited floor space. With that, several brackets exist, including fixed brackets and pivoting brackets (rotation may be pivotal or hinged). Pivoting brackets can be useful for when a user needs or desires to change the viewing angle of the screen. Typically, with pivoting brackets, a user will position the TV where desired, and then when done viewing, will return the TV proximate to the wall. As such, the brackets are not spring-loaded and are not typically controlled by electronics; rather, they are simply manually actuated brackets—a user simply pulls on the TV to adjust it to the desired position. Because of this, it is impractical to mount a TV on a ceiling using one of these brackets, as the TV would remain extended from the ceiling. As such, mounting the TV to a fixed position has remained the standard.

Despite the progress in the art of TV brackets for walls, there has been a considerable lack of improvement in ceiling-mounted brackets. Commonly, as mentioned above, if a user desires to mount a TV to a ceiling, the TV must remain in a fixed position. In other words, it remains proximate to, and parallel with, the ceiling, which is not an ideal viewing angle in many situations. The prior art has attempted to solve this problem (for example, U.S. Pat. No. 6,416,027 to Hart), but due to the cumbersome equipment involved, complicated components, or other issues, the prior art devices have not had market success. Therefore, there not only remains a need for a ceiling-mounted TV bracket that allows the TV to remain mounted proximate to, and recessed in, the ceiling, but that also provides the ability to pivot or rotate the TV to additional viewing angles, as desired by a user. The current disclosure seeks to solve these and other problems.

SUMMARY OF EXAMPLE EMBODIMENTS

In one embodiment, a ceiling-mounted TV frame apparatus comprises a fixed frame, a pivoting frame pivotally coupled to the fixed frame, and one or more linear actuators for actuating the pivoting frame. In one embodiment, the pivoting frame nests within the fixed frame and is coupled thereto using a hinged or otherwise pivoting bracket.

In one embodiment, a method of mounting a TV to a ceiling comprises coupling a TV to a pivoting frame, wherein the pivoting frame is designed to nest within a fixed frame mounted to a ceiling, and wherein the pivoting frame is electronically controlled.

DETAILED DESCRIPTION OF EXAMPLE EMBODIMENTS

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiment," and the like, may indicate that the embodiment(s) so described may include a particular feature, structure, or characteristic, but not every embodiment necessarily includes the particular features, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may. Further, not all drawings may be drawn to scale.

Accordingly, the particular arrangements disclosed are meant to be illustrative only and not limiting as to the scope of the invention. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed process or methods generally may be carried out in various different sequences and arrangements while still falling within the scope of the present invention.

The term "coupled" may mean that two or more elements are in direct physical or electrical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

As will be appreciated from the below disclosure, the ceiling-mounted TV frame apparatus solves the problems in the prior art—namely, the ability to mount a TV to a ceiling while maintaining the ability to adjust the TV viewing angles with minimal hardware, cost, and renovation. While the term "ceiling-mounted TV frame apparatus" is used herein, it will be appreciated that the invention is not limited to ceiling-mounted scenarios and may be used on walls or other surfaces. As such, the term pivotable TV frame may also be used herein.

Figure 1:
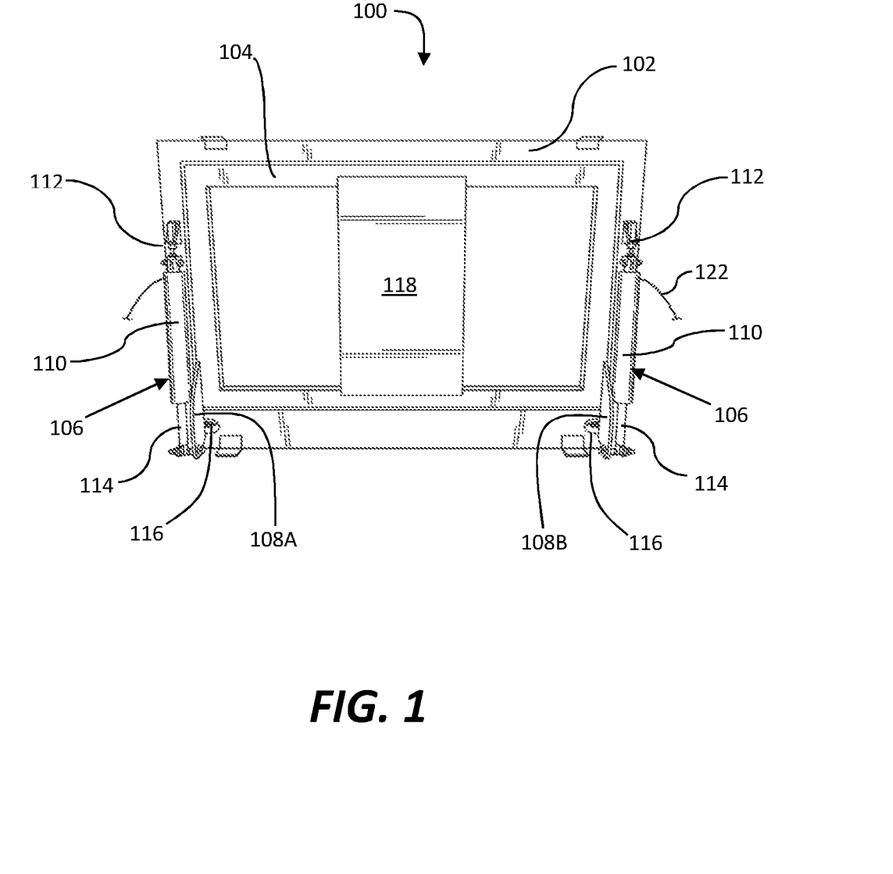
FIG. 1 is a top view of a ceiling-mounted TV frame apparatus.
Figure 2:
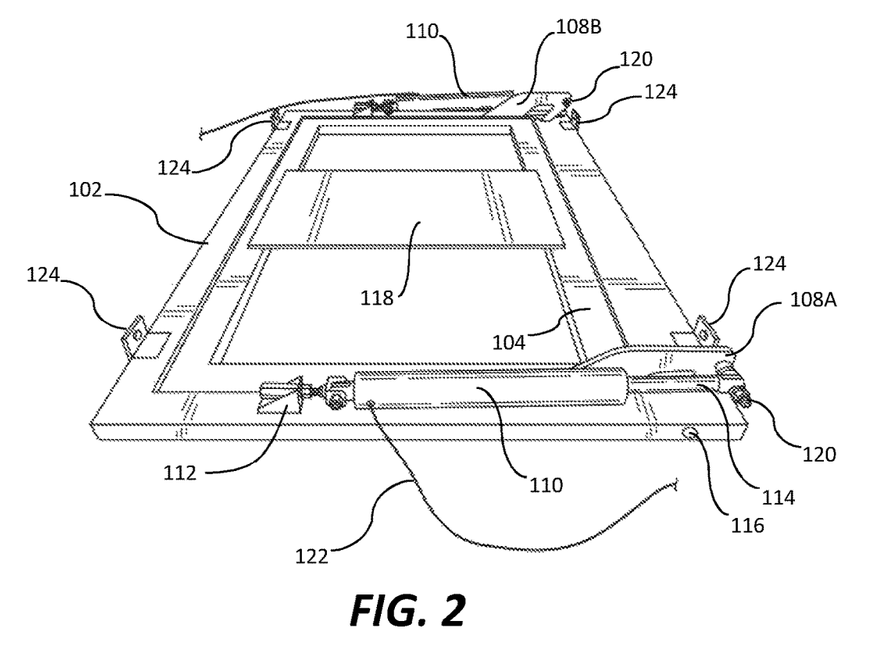
FIG. 2 is a side perspective view of a ceiling-mounted TV frame apparatus.

In one embodiment, as generally shown in FIGS. 1-7, a ceiling-mounted TV frame apparatus 100 comprises a fixed frame 102, a pivoting frame 104 pivotally coupled to the fixed frame 102, and one or more linear actuators 106 for actuating the pivoting frame 104. In one embodiment, and as shown in FIG. 1, the pivoting frame 104 nests within the fixed frame 102 and is coupled thereto using hinged or otherwise pivoting brackets 108A and 108B. For example, the cylinder 110 of the linear actuator 106 is coupled to the fixed frame 102 using a connecting bracket 112 (such as by using a bolt through the connecting bracket 112). The piston 114 is coupled to the pivoting brackets 108A, 108B. The pivoting brackets 108A, 108B are coupled to the fixed frame 102 using bolts 116 (or other coupling means that allows for rotation, such as a rod and pin, etc.) and are coupled to the pivoting frame 104 using welds, bolts, or other securing means (including removable and non-removable means). As shown in FIGS. 1-2, when the rods 114 are fully extended, the pivoting frame 104 remains nested in the fixed frame 102. Pivoting frame 104 may further comprise a TV mounting member 118 for coupling to a TV using standard hardware known in the art. Both the fixed frame 102 and the pivoting frame 104 may be rectangular in shape and may be formed by bending or welding rectangular beams or tubing to one another. In a non-limiting example, four steel members (or aluminum or other suitable material) may be welded together at their ends so as to form a rectangle. The pivoting frame 104 being smaller in circumference so as to be nestable within the fixed frame 102.

Figure 3:
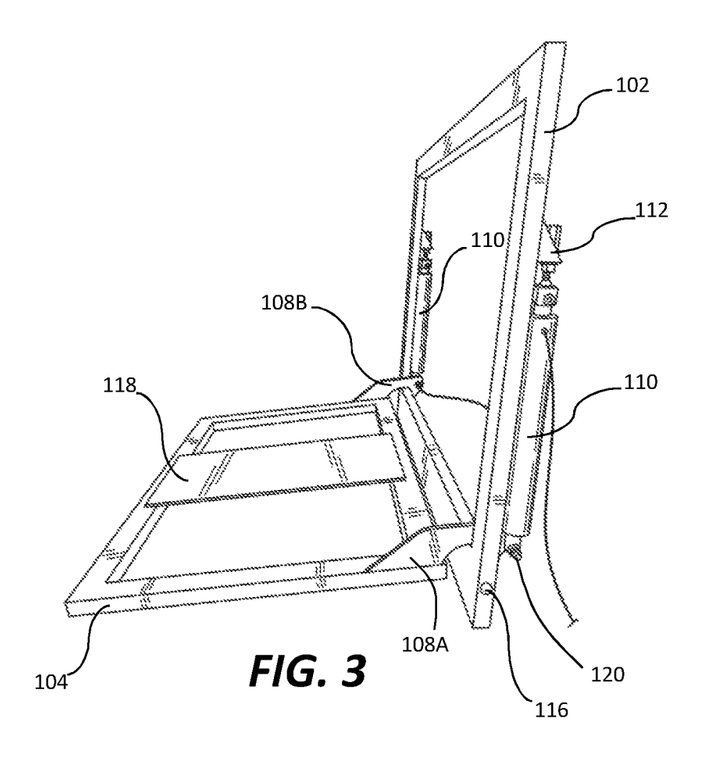
FIG. 3 is a side view of a ceiling-mounted TV frame apparatus with the pivoting frame fully-extended.
Figure 4:
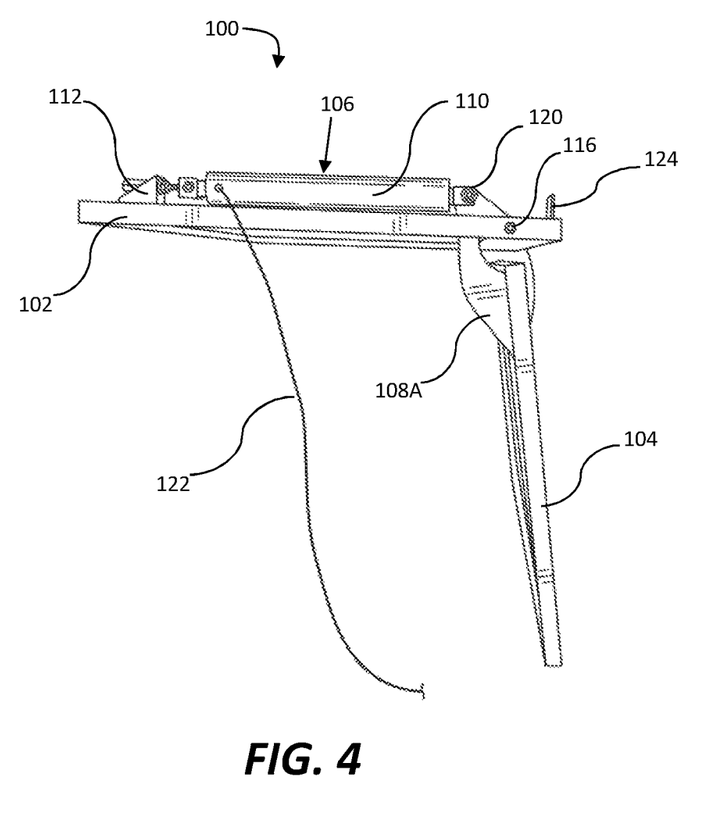
FIG. 4 is a side elevation view of a ceiling-mounted TV frame apparatus with the pivoting frame fully-extended.
Figure 5:
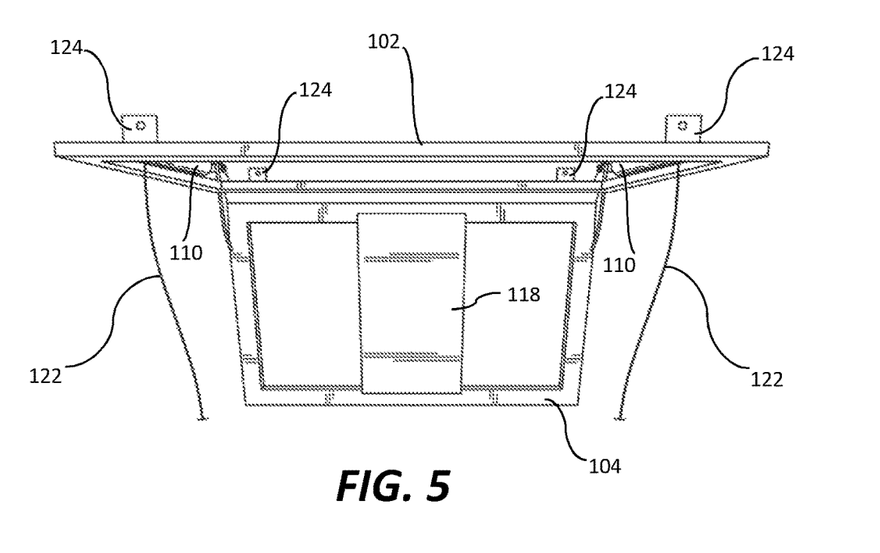
FIG. 5 is a front elevation view of a ceiling-mounted TV frame apparatus with the pivoting frame fully-extended.
Figure 6:
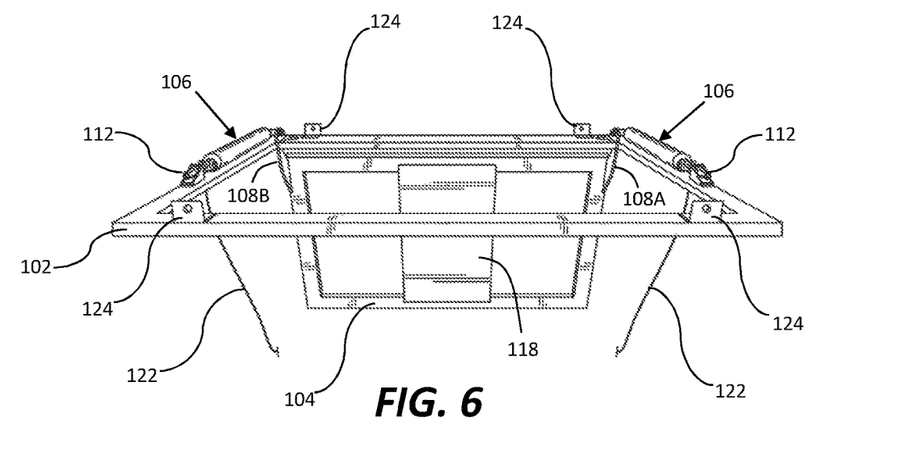
FIG. 6 is a top, front perspective view of a ceiling-mounted TV frame apparatus with the pivoting frame fully-extended.
Figure 7:
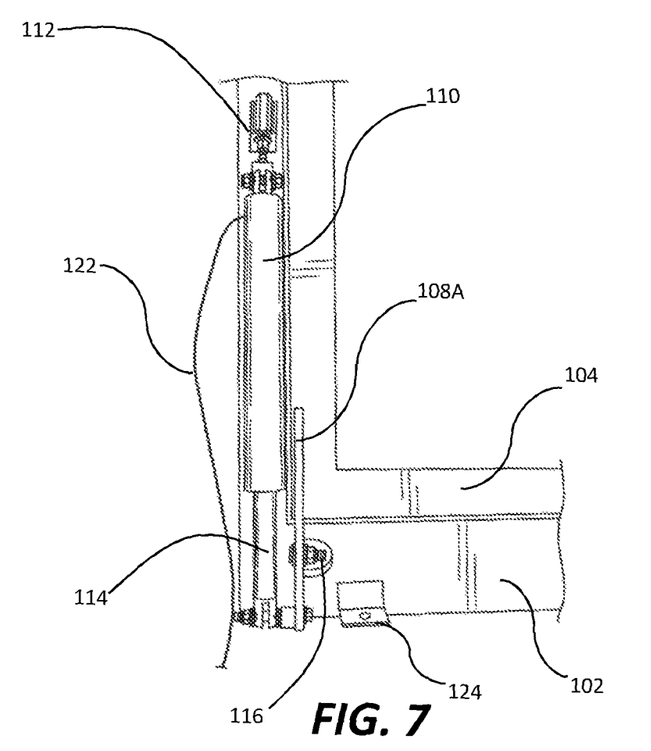
FIG. 7 is a detailed view of a hinged frame and linear actuator for coupling the pivoting frame to the fixed frame.

As shown in FIGS. 3-4, when the cylinder 114 (not visible) is fully retracted within the cylinder 110, the pivoting frame 104 is about at an obtuse angle in relation to the fixed frame 102. This is accomplished by the brackets 108A, 108B rotating at bolts 116 as well as at rod bolts 120 that couple the brackets 108A, 108B to the rods 114. Due to the connection points, the pivoting frame 104 pivots outward and may be positioned at any acute angle in relation to the fixed frame 102 or at a slightly obtuse angle (shown in FIG. 4), dependent upon the position of the rods 114. The pivoting path is determined by the connecting points (116 and 120) of the brackets 108A, 108B. In other words, to fully extend the rod 114, the bolt 120 moves horizontally from a first position to a second position. As the rod 114 extends, the bracket 108A, 108B pivots on bolt 116. The rod bolts 120 allow the bracket 108A, 108B to rotate as required for the movement. It will be appreciated that any coupling means that allow for rotation may be used, such as a threaded bolt, non-threaded bolt with cotter pin, etc. As shown, the linear actuator 106 is electronically controlled, such as by using power input 122. The linear actuator 106 may be internally controlled (e.g., in-line gearmotor), such as that shown in the illustrations, but may also have a motor external thereto. As will be appreciated, when a user can adjust the position of the TV by simply actuating the linear actuators 106 until the desired viewing angle is achieved.

Pivoting frame 104 may comprise a variety of TV attachment brackets or surfaces. As a non-limiting example, the figures illustrate a TV mounting member 118 for mounting a TV thereto using standard mounting means (e.g., screws or similar). Mounting member 118 may be a metal plate or other secure surface for attaching a TV thereto. While mounting member 118 is shown, TVs are configured to mount to numerous brackets, any number of which may be connected or otherwise coupled to the ceiling-mounted TV frame apparatus 100.

In one embodiment, the fixed frame 102 may comprise mounting brackets 124 on its perimeter. The mounting brackets 124 allow the ceiling-mounted TV frame apparatus 100 to be securely mounted to the ceiling (such as by using bolts to secure the mounting brackets 124 to the bottom chord of the trusses). This configuration allows the ceiling-mounted TV frame apparatus 100 to be flush with the ceiling, if desired. In one embodiment (not shown) the fixed frame 102 comprises a channel along the outside edge which allows it to receive additional structural support and to allow the majority of the TV bracket apparatus 100 to remain hidden from view. In other words, studs, drywall, or any combination may be placed within the channel (i.e., tongue and groove) to aid in concealment and support.

Returning to the linear actuator 106, it is coupled to the fixed frame 102 using an actuator connecting bracket 112. By using a bolt or pin with the actuator and connecting bracket 112, the linear actuator 106 is allowed to pivot slightly, compensating for any non-linear movement experienced as the pivoting bracket 108A, 108B pivots the pivoting frame 104 outwards. The linear actuators 106 may also be controlled using a remote, allowing for a user to adjust the viewing angle of the TV without having to reach to the ceiling or other power switch. Such remote power switching devices are well known in the art and do not require additional description herein. It will be appreciated that while a linear actuator is described herein, any number of actuators and/or motor combinations may be used to extend the pivoting frame 104. Further, any standard power source may be configured to work with the linear actuators 106, such as DC power from a vehicle or AC power from an outlet. In other words, it is contemplated that the ceiling-mounted TV frame 100 will be used in houseboats, RVs, and other situations where AC power is not available.

The ceiling-mounted TV frame apparatus 100 may be manufactured from a variety of materials, including, but not limited to, woods, metals, plastics, carbon fibers, and/or any other substantially rigid material that is capable of maintain its integrity when the weight of a TV is attached thereto and pivoted. Further, the ceiling-mounted TV frame apparatus 100 may be manufactured in a variety of sizes, so as to fit the numerous dimensions of TVs in the marketplace.

In one embodiment, a method of mounting a TV to a ceiling comprises inserting a TV into a pivoting frame, wherein the pivoting frame is designed to nest within a fixed frame mounted to a ceiling. In other embodiments, the TV bracket apparatus 100 may be used in any number of surfaces, including walls, drawers, etc. It may be configured to flip down from a ceiling, flip up from a drawer, or flip sideways from a wall. Further, the present disclosure is not solely aimed at stationary buildings, but may be used in RVs, boats, or any other area desirable by a user that has sufficient space to mount a TV. It will be appreciated that the TV may be mounted to the front or the back of the pivoting frame, and may face either direction. In other words, if mounted on the inside, a picture, mirror, or other ornament may be used to conceal the pivoting TV frame apparatus. Once pivoted, the TV screen is exposed from the inside. In other environments, the TV may be mounted to the outside such that the TV is viewable even when the pivoting frame is nested within the fixed frame.

Therefore, as appreciated from the above disclosure, the ceiling-mounted TV frame apparatus solves the problems in the industry by allowing a TV to be mounted and pivotal on a ceiling (or wall) without cumbersome equipment. Particularly, unlike the '027 patent, the use of long, unenclosed drive bolts, as well as pulleys, is avoided, which reduces material, cost, as well as the risk of the drive bolt or pulley systems becoming obstructed due to foreign materials (e.g., ceiling insulation), among other things. In contrast, the pivotable TV frame disclosed herein uses small linear actuators coupled to a pivoting bracket for pivoting the pivoting frame. This reduces materials, size, cost, and risk of obstruction, among other things—effectively overcoming the issues in the prior art.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention as defined in the appended claims. Additionally, it is not intended that the scope of patent protection afforded the present invention be defined by reading into any claim a limitation found herein that does not explicitly appear in the claim itself.

What is claimed is:

1. A pivotable TV frame apparatus, comprising: a fixed frame for mounting to a surface, the fixed frame comprising a first linear actuator on a first side, and a second linear actuator on a second side, wherein said first and second linear actuators allow a user to adjust the position of the TV, until the desired viewing angle is achieved; a pivoting frame having a first pivoting bracket on a first side and a second pivoting bracket on a second side, the pivoting brackets configured to pivot around the fixed frame; wherein the first pivoting bracket of the pivoting frame is coupled, at a first location, to the first linear actuator of the fixed frame, and is further coupled, at a second location, to the fixed frame; wherein the second pivoting bracket is coupled, at a first location, to the second linear actuator of the fixed frame, and is further coupled, at a second location, to the second linear actuator of the fixed frame; wherein when the first and second linear actuators are fully extended, the pivoting frame is received within the fixed frame and the first and second linear actuators remain parallel to the fixed frame; and wherein when the first and second linear actuators are not fully extended, the pivoting brackets are at least partially extended around the fixed frame and the pivoting frame is angled relative to the fixed frame while the first and second linear actuators remain parallel to the fixed frame.

2. The pivotable TV frame apparatus of claim 1, further comprising a plurality of mounting brackets coupled to the fixed frame.

3. The pivotable TV frame apparatus of claim 1, further comprising a channel running about the circumference of the fixed frame, the channel configured to receive construction materials from a structure to which it is mounted.

4. A method of mounting a TV to a ceiling using the pivotable TV frame apparatus of claim 1, the method comprising securing the fixed frame to the ceiling using a plurality of bolts, providing power to the first and second linear actuators, mounting a TV to the pivoting frame, and selectively powering the first and second linear actuators to position the pivoting frame and TV mounted thereto to the desired viewing angle.

5. A pivotable TV frame apparatus, comprising: a fixed frame comprising four frame members configured and welded to form a rectangle; a pivoting frame comprising four frame members configured and welded to form a rectangle sized so as to be nestable within the fixed frame, and further comprising two pivoting brackets mounted on a first end at opposing sides; the pivoting brackets being coupled to the fixed frame using bolts; a first linear actuator mounted on the fixed frame on a first side, the rod of the first linear actuator being coupled to the first pivoting bracket, a second linear actuator being mounted on the fixed frame on a second side, the rod of the second linear actuator being coupled to the second pivoting bracket, wherein said first and second linear actuators allow a user to adjust the position of the TV, until the desired viewing angle is achieved; the first and second linear actuators being electronically controlled; wherein when the rods of the first and second linear actuators are fully-extended, the pivoting frame is nested within the fixed frame; and wherein when the rods of the first and second linear actuators are at least partially retracted, the pivoting brackets are at least partially extended around the fixed frame and the pivoting frame is angled in relation to the fixed frame; and the first and second linear actuators remain parallel to the fixed frame when extended and retracted.

6. The pivotable TV frame apparatus of claim 5, further comprising a plurality of mounting brackets coupled to the fixed frame.

7. The pivotable TV frame apparatus of claim 5, further comprising a channel running about the circumference of the fixed frame, the channel configured to receive ceiling materials.

8. The pivotable TV frame apparatus of claim 1, wherein the first and second linear actuators are electronically controlled.

* * * * *